United States Patent [19]

Bondoc et al.

[11] 4,233,353
[45] * Nov. 11, 1980

[54] HIGH-STRENGTH BUILT-UP ROOFING USING IMPROVED GLASS FIBER MATS

[75] Inventors: Alfredo A. Bondoc, Middlesex; V. Robert Canfield, Martinsville; B. Randall Ziegler, Freehold, all of N.J.

[73] Assignee: GAF Corporation, New York, N.Y.

[*] Notice: The portion of the term of this patent subsequent to Nov. 11, 1997, has been disclaimed.

[21] Appl. No.: 39,575

[22] Filed: May 16, 1979

[51] Int. Cl.³ .................... B32B 5/22; B32B 17/02
[52] U.S. Cl. .................................. 428/141; 52/515; 162/123; 162/135; 162/156; 428/143; 428/144; 428/284; 428/285; 428/288; 428/291; 428/297; 428/298; 428/302; 428/303; 428/426
[58] Field of Search ............... 428/288, 289, 290, 293, 428/294, 295, 297, 299, 302, 399, 426, 374, 392, 284, 285, 141, 143, 144, 291, 298, 303; 162/149, 156, 123, 135; 52/515

[56] References Cited

U.S. PATENT DOCUMENTS 2,747,994  5/1956  Hoopes .................... 162/156
4,112,174  9/1978  Hannes et al. ............. 428/288

Primary Examiner—James J. Bell
Attorney, Agent, or Firm—Walter C. Kehm; Walter Katz

[57] ABSTRACT

High-strength built-up roofing (BUR) membranes and systems are provided herein. These BUR products are made using improved glass fiber mat structures having unusual tear resistance in place of organic felts.

The glass fiber mats are constructed from two fibrous components, namely, individual filaments, which provide the uniform denseness required for impregnation of saturant asphalt in the interstices of the mat, and extended fiber elements formed by longitudinal extension and connection of fibers from bundles of glass fibers in a wet-laid process, which furnish tear resistance and tensile strength to the BUR membranes and systems.

The BUR membranes and systems of this invention have exceedingly high strengths compared with commercially available products of similar construction, and, advantageously, they can be manufactured by a very economical process.

6 Claims, 3 Drawing Figures

HIGH-STRENGTH BUILT-UP ROOFING USING IMPROVED GLASS FIBER MATS

BACKGROUND OF THE INVENTION

1. Field of the Invention

This invention relates to new and improved built-up roofing membranes and systems using high-strength glass fiber mats.

2. Description of the Prior Art

Built-up roofing ("BUR") membranes and systems are used primarily on commercial buildings, and used to the substantial exclusion of other roofing types on large industrial buildings of low profile. Its popularity arises from its relatively low cost combined with its effectiveness as a weather repellant surface and its durability. The major drawback in its use is that very high strengths are required, substantially exceeding those of roofing shingles for residential construction. These rigid requirements arise because built up roofing systems are subject to severe stresses induced internally or externally by the surrounding atmosphere, including expansion caused by the presence of moisture internal to the system, and both expansion and contraction forces caused by variation in ambient temperature conditions. For these and other reasons, it is essential that built up roofing systems posses both excellent tear resistance and tensile strengths.

A built-up roofing system is conventionally constructed by (1) applying multiple layers or membranes which are parallel strips of asphalt, impregnated felt in succession onto a rigid roof base, with appropriate overlapping at the joints between adjacent parallel strips used to form a single layer from rolls of the felt, and (2) covering each layer of felt in succession with a coating of fluid hot asphalt and adhesives onto which coating the succeeding layer of felt is applied and adhered before the hot asphalt has cooled to solid form. When the rigid deck for the roofing is a wooden material, for example plywood, it is customary to fasten the bottom layer of felt to the deck with suitable nails. When the deck is concrete, gypsum board, or other material unsuitable for nailing, a bottom coating of primer asphalt is applied thereto to fasten the bottom felt layer to the deck. The top layer of felt receives a final coating of asphalt which optionally is protected by a layer of loose aggregate imbedded in and covering the asphalt.

In the past, most roofing products were made of organic rag felt impregnated with asphalt. However, organic felt is not fire-resistant and it is expensive to manufacture. Accordingly, the industry has looked to glass fiber mats to replace organic felts in this application. Prior art roofing products using glass fiber mats are described in U.S. Pat. Nos. 4,129,674; 4,135,022 and 4,135,029. Unfortunately, the built-up roofing products using such glass fiber mats of the prior art, which rely upon continuous strands or elongated, rod-like bundles of fibers as reinforcing agents, often are expensive and difficult to make, or do not possess the high-strength properties, particularly desired for built-up roofing application.

Therefore, it is the object of this invention to provide new and improved built-up roofing membranes and systems, which can be manufactured economically using high-strength glass fiber mats, and which satisfy the rigid standards required of such products. In particular, a feature of this invention is the provision of such products which possess a unique combination of tear resistance and tensile strength, and which can be manufactured using inexpensive raw materials at a rapid rate of production.

SUMMARY OF THE INVENTION

What is provided herein are high-strength built-up roofing membranes and systems which utilize improved glass fiber mats of unusual tear resistance in place of organic felts. The BUR products of the invention are characterized particularly by their excellent tensile strengths and economy of manufacture, as compared to other commercially available products of similar construction.

The BUR membrane of the invention includes a novel glass mat structure as a felt. The mat is formed from bundles of chopped glass fibers by the wet-laid process. The fibers therein have a length of about 1¾ to 3 inches. The mat structure includes two fibrous components, namely, individual filament glass fibers and extended glass fiber elements. The filaments provide the quality of uniform denseness in the mat necessary for efficient impregnation of saturant asphalt into the interstices of the mat to form the BUR membrane. The extended fiber elements contribute substantially to the high-strength properties of the mat. Generally, the extended fiber elements predominate by weight over the individual filaments; preferably, in a ratio of about 60% to 40% by weight of the total fibrous material in the mat. The extended fiber elements are characterized structurally by being comprised of a plurality of longitudinally connected fibers formed from extension of bundles of fibers which slide apart during the process of dispersion of the fiber bundles. Thus the fiber elements have an exaggerated length and a non-uniform diameter, being greater in the mid-section, where connection of fibers are greatest, and tapered towards its ends.

The BUR membranes are fabricated by impregnation of the mat with saturant asphalt. The built-up roofing systems of the invention, for example, 3-ply BUR systems, are made from multiple layers of such membranes which are held together by coatings of asphaltic adhesive.

RELATED COPENDING APPLICATIONS

1. U.S. Patent Application, Ser. No. 851,683 filed Nov. 11, 1977 assigned to the same assignee as this application, describes a process of making uniform glass filament mats from an aqueous dispersion formed from bundles of glass fibers and a tertiary amine oxide dispersant.

2. U.S. Patent Application, Ser. No. 039,577 filed concurrently herewith, by the same inventors, and assigned to the same assignee as this application, claims a high-strength glass fiber mat of novel structure made by the wet-laid process.

3. U.S. Patent Application, Ser. No. 039,578 now U.S. Pat. No. 4,200,487 concurrently herewith, by the same inventors, and assigned to the same assignee as this application, claims a wet-laid process for making a high-strength glass fiber mat having a novel structure.

DETAILED DESCRIPTION OF THE INVENTION

Figure 1:
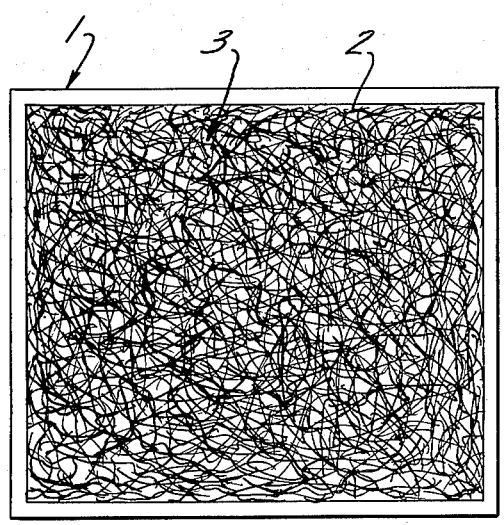
FIG. 1 is a photograph of a high-strength glass fiber mat used in the built-up roofing products of this invention.

Turning now to the drawings, and particularly to FIG. 1, there is shown a photograph of a high-strength glass fiber mat structure used as a felt in the built up membranes and systems of the invention. The glass mat is generally designated by reference numeral 10. The mat is comprised of two fibrous components, namely, a plurality of individual glass filaments fibers 1 and a plurality of extended glass fiber elements 2. both of which are substantially randomly oriented and uniformly dispersed throughout the mat. A binder substance (not shown) is provided to hold the fibrous materials together.

The glass fiber mat felt is made in a wet-laid process, generally from a single source of raw material, namely, bundles of fiber glass. Accordingly, in this process, chopped bundles of glass fibers of rather long length, between 1¾ and 3 inches, are added to an aqueous solution of a suitable dispersant in a mixing tank. Each bundle contains many fibers, often between 20 to 300 fibers per bundle. The fibers in these bundles may be sized or unsized, wet or dry, as long as they can be suitably dispersed in the aqueous dispersant medium.

The mixture of fiber bundles in the aqueous dispersement medium then is agitated very gently to form a dilute fiber slurry of selected consistency. During this agitation, some of the fibers in the bundles become filamentized, i.e. form individual filaments. The remaining fibers in a partially filamentized bundle (or fibers in an original unfilamentized bundle) then slide apart and become connected longitudinally to form an extended glass-fiber element. These fiber elements thereby have an effective length which exceeds that of the fibers themselves within the element. The diameter of an extended fiber element is non-uniform, as contrasted to the fibers therein, being greater in the middle portion thereof, where connection of fibers is greatest, than at its ends where connection of fibers is at a minimum. Thus the extended fiber elements taper outwardly from the middle thereof towards each end portion.

Preferably, a single source of fiber bundles having the same physical and chemical properties, including length, diameter, sizing, electrical characteristics, etc. are used in the process of forming the glass mats. However, bundles with fibers of differing dimensions also may be used.

The extended fiber elements of the glass mat contribute substantially to the high-strength properties of the mat while the individual filaments provide the uniform denseness necessary for impregnation of saturant asphalt in the manufacture of the built-up roofing membranes. The individual filaments suitably are present in the glass mat in an amount of about 20% to 60% by weight of the total fibrous material, while the extended fiber elements comprise about 40% to 80%. Preferably, however, the individual filaments comprise only about 30% to 50% by weight of the mat and the fiber elements about 50% to 70%. In the best mode of the invention, the individual filaments constitute 40% and the extended fiber elements predominate at about 60% of the mat.

The glass fibers in the bundles are selected to have a relatively long length, suitably, about 1¾ to 3 inches, preferably about 2 to 2½ inches, and, optimally, 2¼ inches in length. The use of longer fibers provides more fiber elements in the mat at the expense of individual filaments for a given degree of agitation. The fiber diameter is not a critical parameter. For practical reasons, however, commercial fibers have a diameter of about 8 to 20 microns, and, preferably about 12 to 16 microns, are used.

Mild agitation of the dispersion slurry for short periods of time favors the formation of the desired ratio of individual filaments to extended fiber elements. Clearly, the intense agitation normally employed in wet-laid processes for making uniform glass mats is not used here. Such agitation forms highly filamentized glass mats from fiber bundles which do not contain the substantial amount of fiber elements which are part of the mat of this invention. However, conventional mixing equipment may be utilized as long as agitation is carried out at relatively low propeller speeds and for short periods of time. Usually, for a 4 liter slurry, which is used to make hand sheets, for example, about 1.5 watt-hour of energy is applied for each 5 minutes of agitation. Usually agitation is continued for less than 30 minutes, and preferably for only about 5 to 15 minutes. In commercial equipment, mild agitation for short periods of time is also used.

Any suitable dispersant material may be used to form the fiber dispersion slurry. Many such dispersants are known in the art and are available for this purpose. However, a particularly useful dispersant is a tertiary amine oxide, such as Aromox DMHT, which is dimethyl hydrogenated tallow amine oxide, sold by Armak Chemical Co., and described in the aforementioned copending application. This dispersant suitably is used in a concentration of about 2 to 100 ppm, preferably about 5 to 30 ppm, and, optimally, about 10 ppm, of the fiber slurry.

The dispersion slurry suitably is maintained at a dispersion consistency of about 0.1 to 2% by weight of the fibers in the slurry, preferably about 0.2 to 1%, and, optimally, about 0.5%. As in the usual wet-laid processes, the concentrated dispersion slurry is diluted with water before being applied to the mat-forming screen. Preferably the dispersion slurry is diluted about 5 to 25 times at the screen, and, optimally, about 10 times. Generally, higher dispersion and formation consistencies favor generation of extended fiber elements at the expense of individual filaments.

The glass mat thus-formed then is provided with a suitable binder to hold the fibrous components together. Any commercially available binder may be used, such as urea-formaldehyde or phenol-formaldehyde resins. The binder usually is applied in an amount of about 3 to 45% by weight of the finished mat, preferably about 10 to 30%, and, optimally, about 15 to 20%. Generally, too much binder decreases the porosity of the mat to an unsuitable condition, whereas too little binder diminishes the integrity of the mat unreasonably.

Suitably the basis weight of the finished mat (with binder) should be at least 1 lb/100 sq. ft. (49 g/sq.m.), and, preferably, about 2.0% to 3.0 lbs/100 sq.ft. (98 to 148 g/sq.m.).

The glass mats used as felts in the built up roofing membranes and systems of the invention are characterized by very high strength properties. Generally, these mats have an Elmendorf tear strength of about 8 Newtons at a basis weight of 98 g/sq.m. Three-ply built up roofing systems, using such mats, have a tensile strength of about 234 lbs/inch (CMD) at 0° F.

Figure 2:
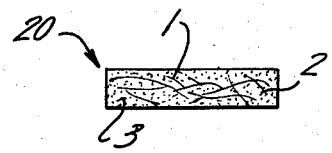
FIG. 2 illustrates a built up roofing membrane of the invention.

Referring now to FIG. 2, there is shown the built up roofing membrane of the invention, referred to as 20. The membrane includes the glass mat 10 as a felt material. The mat is impregnated with saturant asphalt 3 in rolled-up sheets.

Figure 3:
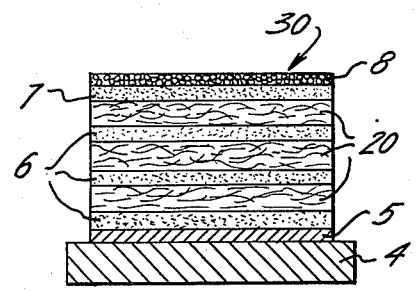
FIG. 3 shows a typical 3-ply composite built up roofing system of the invention.

FIG. 3 shows a typical built up roofing system of the invention. The embodiment illustrated is a 3-ply system, generally indicated by reference numeral 30. The system is secured to a roof deck 4 covered by appropriate insulation 5 (optional) by means of an asphaltic adhesive coating 6. The successive membranes also are adhered to each other with additional coatings 6. The top membrane is covered with a coating asphalt layer 7 which may include therein aggregate material 8.

The following examples will further illustrate the invention.

PREPARATION OF BUILT UP ROOFING MEMBRANE OF INVENTION

Example 1

A quantity of sized, wet chopped strand fiber, 2 inches in length, 16 mm. in diameter, weighing 3 g. on a dry basis, was added to 4 l. of water containing 20 ppm of Aromox DMHT. The resulting slurry was agitated with a Lightning mixer equipped with a propeller type stirrer set at about 400 rpm. for periods of 5, 10 and 20 minutes. The thus-agitated dispersion slurry composition then was drained through a wire mesh upon which the glass mat was formed. After drying, a urea-formaldehyde binder was applied to form a finished mat having a basis weight of 98 g/sq.m. The mat thus-formed for 5 minutes of agitation was comprised of about 40% filament fibers and 60% of extended fiber elements, by weight of the total fibrous material in the mat. The tear strength of this mat was 8 Newtons (CMD) at 0° F. (Elmendorf Standard).

The above formed mat was impregnated with saturant asphalt to provide a built up roofing membrane having excellent high-strength properties.

B. COMMERCIAL EQUIPMENT

Example 2

60 kg of K filament, sized, wet chopped strand, 2 inch glass fibers were fed into an 80 cubic meter tank filled with an aqueous solution containing 10 ppm. of Aromox DMHT. The filter consistency in the stock solution was 0.4%. The tank was cylindrical, upright, having a diameter of 5 meters, and was equipped with a side entering 3-blade propellor agitator. The blades have a variable slope angle normally set at about 15° to 18°, and are circular in shape, being about 200 to 250 mm. at the widest point and having rounded, dull edges. The propeller measures about 1300 mm in diameter and was mounted on a shaft about 200 to 250 mm. in diameter, driven by a motor at about 80 to 120 rpm. The stock was agitated for about 5 minutes; the energy input was about 0.6 kw-hr. for this period of agitation.

The agitated stock then was pumped to a mat-forming machine. Enroute the stock was diluted in a tank with water containing 10 ppm. of Aromox DMHT to a formation consistency of 0.04%. Thereafter, the mat thus-formed was impregnated with a urea-formaldehyde binder, dried and cured. The resultant mat contains about 20% binder and 80% fibrous material having a basis weight of 100 g/sq.m. The fibrous components of the mat comprises about 60% by weight of extended fiber elements and about 40% by weight of substantially individual filaments.

The above formed mat was impregnated with saturant asphalt as above to provide a built up roofing membrane of excellent properties.

PREPARATION OF 3-PLY BUILT UP ROOFING SYSTEM

Example 3

The membranes of Example 1 were unrolled and asphaltic adhesive material was applied between successive membrane layers. The tensile strength of this system was 234 lbs/inch (CMD) at 0° F. at a mat basis weight of 98 g/m²., which is an unusually high tensile strength for such a system. By comparison, similar commercial systems using discrete fiber glass mats exhibited tensile strengths in the range of only about 134 to 177 lbs/inch.

What is claimed is:

1. A built-up roofing system comprising:
   (a) multiple plies of high-strength built-up roofing membranes comprising:
      (a') a high strength glass fiber mat which is formed from bundles of glass fibers by the wet-laid process, said fibers having a length of about 1¾ to 3 inches and a diameter of about 8 to 20 microns, comprising:
         (i) a plurality of individual filament glass fibers comprising about 20% to 60% by weight of the fibrous material in said mat,
         (ii) a plurality of extended glass fiber elements comprised of longitudinally connected fibers said elements there having a length which is greater than the length of the fibers in said element, and a diameter which is non-uniform, being greater in the mid-portion thereof than at its ends, said elements comprising about 40% to 80% by weight of the fibrous material in said mat,
         both said individual filament fibers and said extended fiber elements being substantially randomly oriented and uniformly dispersed throughout said material, and,
         (iii) a binder substance to hold said fibrous material together, and,
      (b') saturant asphalt impregnated in said mat, and
   (b) adhesive asphaltic coatings between said membranes.

2. A system according to claim 1 having three membranes.

3. A system according to claim 1 in which said bottom membrane is secured to a roof deck with an additional adhesive asphaltic coating.

4. A system according to claim 3 further characterized by including on said top membranes a top coating of asphalt.

5. A system according to claim 4 in which said top coating of asphalt includes an aggregate material therein.

6. A system according to claim 2 having a tensile strength (CMD at 0° F.) of about 234 lbs/inch at a glass mat basis weight of 98 g/m².

* * * * *